United States Patent
Shibasaki

(10) Patent No.: US 7,280,488 B2
(45) Date of Patent: Oct. 9, 2007

(54) COMMUNICATION DEVICE, NETWORK SYSTEM USING SAME, AND METHOD OF CONSTRUCTING SPANNING TREE

(75) Inventor: Yasuaki Shibasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1058 days.

(21) Appl. No.: 10/156,012

(22) Filed: May 29, 2002

(65) Prior Publication Data

US 2002/0181412 A1   Dec. 5, 2002

(30) Foreign Application Priority Data

May 30, 2001   (JP)   ............................. 2001-161541

(51) Int. Cl.
 *H04L 12/28* (2006.01)
(52) U.S. Cl. ...................... 370/256; 370/254
(58) Field of Classification Search ................ 370/244, 370/256, 258, 389, 400, 401, 402, 404, 405, 370/406
See application file for complete search history.

(56) References Cited

U.S. PATENT DOCUMENTS

| | | | | |
|---|---|---|---|---|
| 5,761,435 A * | 6/1998 | Fukuda et al. | ............... | 709/238 |
| 6,081,512 A * | 6/2000 | Muller et al. | ............... | 370/256 |
| 6,188,694 B1 * | 2/2001 | Fine et al. | ................... | 370/402 |
| 6,236,659 B1 * | 5/2001 | Pascoe | ........................ | 370/404 |
| 6,396,814 B1 * | 5/2002 | Iwamura et al. | ............. | 370/256 |
| 6,694,361 B1 * | 2/2004 | Shah et al. | .................. | 709/238 |
| 6,816,461 B1 * | 11/2004 | Scrandis et al. | ............ | 370/242 |
| 6,857,027 B1 * | 2/2005 | Lindeborg et al. | .......... | 709/239 |
| 6,891,808 B2 * | 5/2005 | Ishii | ........................... | 370/256 |
| 6,937,576 B1 * | 8/2005 | Di Benedetto et al. | ..... | 370/256 |
| 7,076,594 B2 * | 7/2006 | Benedetto et al. | .......... | 710/316 |

FOREIGN PATENT DOCUMENTS

| | | |
|---|---|---|
| GB | 2 333 931 A | 8/1999 |
| JP | 5-327719 | 12/1993 |
| JP | 6-350606 | 12/1994 |
| JP | 11-168490 | 6/1999 |

* cited by examiner

*Primary Examiner*—Phirin Sam
(74) *Attorney, Agent, or Firm*—Foley & Lardner LLP

(57) ABSTRACT

Spanning tree bridge is devised to minimize the service interruption time after occurrence of a fault in a network or in a component of the network by enabling faster recovery from the fault and by limiting tree reconstruction to a smallest possible area. In a bridged LAN formed of a plurality of LANs, a plurality of spanning trees are defined in one bridge such that a spanning tree is divided without dividing a LAN segment. To enable this, a plurality of spanning tree management units are provided in one bridge and are given unique bridge IDs for spanning tree management units. The arrangement is such that ports can be assigned to the spanning tree management units in a predetermined relationship. Therefore each management unit can independently perform spanning tree construction processing to divide a spanning tree in one LAN segment into a plurality ones, and a bridged LAN in which a plurality of spanning trees can exist in one LAN segment can be formed.

15 Claims, 9 Drawing Sheets

FIG. 4

C-BPDU FORMAT

| PROTOCOL ID |
| :---: |
| PROTOCOL VERSION ID |
| BPDU TYPE |
| FLAGS |
| ROOT ID |
| ROOT PATH COST |
| BRIDGE ID |
| PORT ID |
| MESSAGE TYPE |
| MAX AGE |
| HELLO TIME |
| FORWARD DELAY |

COMMUNICATION DEVICE, NETWORK SYSTEM USING SAME, AND METHOD OF CONSTRUCTING SPANNING TREE

BACKGROUND OF THE INVENTION

1. Field of the Invention

The present invention relates to a communication device, a network system using the same, and a method of constructing a spanning tree, and more particularly, to a method of constructing a spanning tree in a network system in which a plurality of networks are interconnected through bridges.

2. Description of the Prior Art

A conventional bridge network using a spanning tree will be described with reference to FIGS. 7 and 10. In the network shown in FIG. 7, bridges 1, 3, and 4 are interconnected by a local area network (LAN) A; bridges 1, 2, and 5 are interconnected by a LAN B; and bridges 2, 3 and 4 are interconnected by a LAN C.

Further, bridges 5, 6, 8, and 9 are interconnected by a LAN D; bridges 7, 8, and 9 are interconnected by a LAN E; and bridges 6 and 7 are interconnected by a LAN F.

Each of the bridges 1 to 9 has the function of constructing a spanning tree by transmitting and receiving configuration-bridge protocol data units (C-BPDU) specified in IEEE802.1d. FIG. 10 shows the state of a spanning tree constructed as a result of exchange of CBPDUs.

A spanning tree is constructed with the bridge 1 determined as a root bridge, as indicated by the dotted line in FIG. 10. A spanning tree is thus constructed to enable transfer of data packets without forming a loop on the network formed of a plurality of LANs connected by bridges.

In FIGS. 7 and 10, "BRIDGE ID" is an identification number for identification of each bridge, and "PORT ID" is an identification number for each port. Also, "ROOT PATH COST" and "PATH COST" are values each representing the facility for reaching to the root bridge. Each time a spanning tree is constructed and a signal passes one of the bridges, the value of the path cost at the bridge (port) is incremented. The root path cost and the path cost are used as parameters such as to enable selection of the bridge (port) with the minimized root path cost (easier to reach).

However, there is a problem with the conventional spanning tree, as described below. When the link between some of the bridges constituting the network is lost due to a fault in the bridges or a fault in the network connected between the bridges, reconstruction of a spanning tree is performed in accordance with a rule specified by IEEE802.1d. When this reconstruction is performed, spanning tree configuration information on the constructed spanning tree and a filtering data base for data packet forwarding obtained by learning are entirely initialized and a tree is newly constructed.

A considerably long time, depending on the number of bridges constituting the reconstructed network of the tree, is required for the reconstruction, and data packets to be transferred onto the network are not transferred until the reconstruction is completed. That is, a condition similar to service interruption occurs. If the scale of the bridge network is larger (the number of bridges constituting the network is larger), a worse condition results.

BRIEF SUMMARY OF THE INVENTION

An object of the present invention is to provide a communication device, a network system using the same, and a system and method for constructing a spanning tree, which are devised to minimize the service interruption time after occurrence of a fault in a network or in a component of the network by enabling faster recovery from the fault and by limiting tree reconstruction to a smallest possible area.

To achieve the above-described object, according to one aspect of the present invention, there is provided a communication device for interconnecting a plurality of networks, the communication device having a plurality of spanning tree management means for managing spanning trees in the plurality of networks. Each of the spanning tree management means may be given in advance abridge ID which is identification information for management of spanning trees, and a spanning tree construction processing procedure may be executed by using the bridge IDs. Also, the communication device may include control means for controlling assignment of a plurality of ports forming interfaces with the networks to the plurality of spanning tree management means.

The above-described control means may perform the assignment control by referring to a table in which a state of assignment between the plurality of ports and the plurality of spanning tree management means is stored. Each of the spanning tree management means may execute the spanning tree construction processing procedure by exchanging bridge protocol data units with other communication devices, and the control means may determine, by referring to the table, to which one of the spanning tree management means each of the ports receiving the bridge protocol data units is assigned.

According to another aspect of the present invention, there is provided a network system including a plurality of networks and communication devices through which the networks are interconnected, each of the communication devices having a plurality of spanning tree management means for managing spanning trees in the plurality of networks.

According to still another aspect of the present invention, there is provided a method of constructing a spanning tree in a network system having a plurality of networks and communication devices for interconnecting the networks and for managing spanning trees, the method including, as a step performed in each of the spanning tree management means, a step of executing a spanning tree construction processing procedure by using bridge IDs which are identification information respectively given in advance to the spanning tree management means to enable spanning tree management.

In the above-described method, the spanning tree construction processing procedure may be executed by exchanging bridge protocol data units with other communication devices. The method may further include a step of determining, in response to reception of one of the bridge protocol data units, to which one of the spanning tree management means a port receiving the bridge protocol data unit is assigned, the determination being made by referring to a prescribed table.

According to a further aspect of the present invention, there is provided a recording medium on which is recorded a program for making a computer execute control of the operation of a communication device for interconnection between a plurality of networks, the program including a control step for controlling assignment of a plurality of spanning tree construction processing procedures to a plurality of ports forming interface with the networks. The assignment control in the control step may be performed by referring to a table in which a state of assignment between the plurality of ports and the plurality of spanning tree construction processing procedures is stored in advance.

Each of the plurality of spanning tree construction processing procedures is executed by exchanging bridge protocol data units with other communication devices, and the control step may include determining, by referring to the table, to which one of the spanning tree construction processing procedures each of the ports receiving the bridge protocol data units is assigned.

The functions of the present invention will be described. In a bridged LAN formed of a plurality of LANs, a plurality of spanning trees are defined in one bridge such that a spanning tree is divided without dividing a LAN segment. To enable this, a plurality of management units for managing spanning trees are provided in one bridge and are controlled so that a plurality of ports forming interfaces with the LANs can be assigned to them with flexibility. Also, unique bridge IDs for spanning tree management are given to the management units. Therefore each management unit can independently perform spanning tree construction processing to divide a spanning tree in one LAN segment with flexibility. Thus, a bridged LAN in which a plurality of spanning trees can exist in one LAN segment can be formed.

BRIEF DESCRIPTION OF THE DRAWINGS

FIG. 4 is a diagram showing a C-BPDU format;

DETAILED DESCRIPTION OF THE PREFERRED EMBODIMENTS

Figures 1, 2:
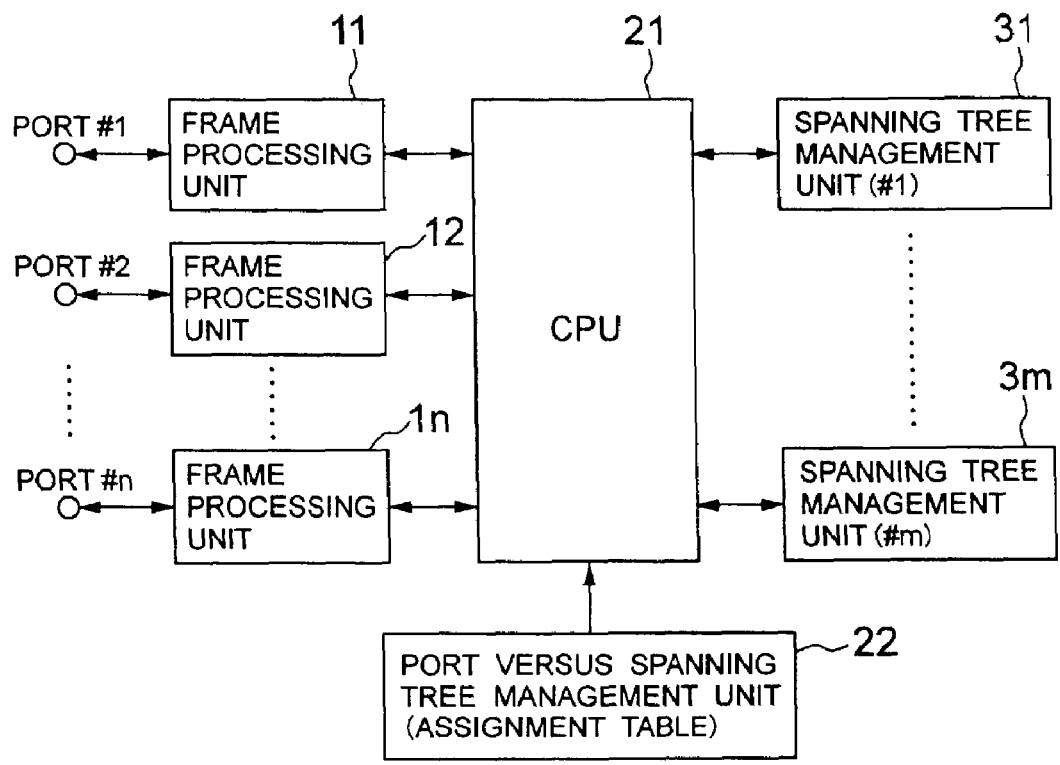
FIG. 1 is a block diagram of an embodiment of the present invention.
FIG. 2 is one example of a port versus spanning tree management unit assignment table.

Embodiments of the present invention will be described with reference to the accompanying drawings. FIG. 1 is a diagram outlining a spanning bridge which represents an embodiment of the present invention. Referring to FIG. 1, the bridge has a plurality of spanning tree management units 31 to 3$m$ (m: integer equal to or larger than 2). Ports #1 to #n (n: an integer equal to or larger than 2) (each forming an interface with a LAN) to be managed by the spanning tree management units 31 to 3$m$ are respectively assigned to the management units according to a setting externally made (by a network administrator or the like).

It is assumed that, to enable assignment of the ports, a port versus spanning tree management unit assignment table 22 is provided, and the assigned conditions are externally set at the system design stage by a network administrator or the like. A central processing unit (CPU) (control unit) 21 determines a distribution of C-BPDUs (also referred to as CBPDUs) received through the plurality of ports #1 to #n among the spanning tree management units by referring to the table 22, and supplies the received C-BPDUs to the spanning tree management units determined as distribution destinations.

Frame processing units 11 to 1n are provided between the ports and the CPU 21 to process received data frames and received C-BPDUs from the ports as well as data frames and C-BPDUs to be sent out through the ports. FIG. 2 shows an example of the contents of the port versus spanning tree management unit assignment table 22, in which the port #1 is assigned to the spanning tree management unit #1 and the ports #2 and #3 are assigned to the spanning tree management unit #3.

Figure 3:
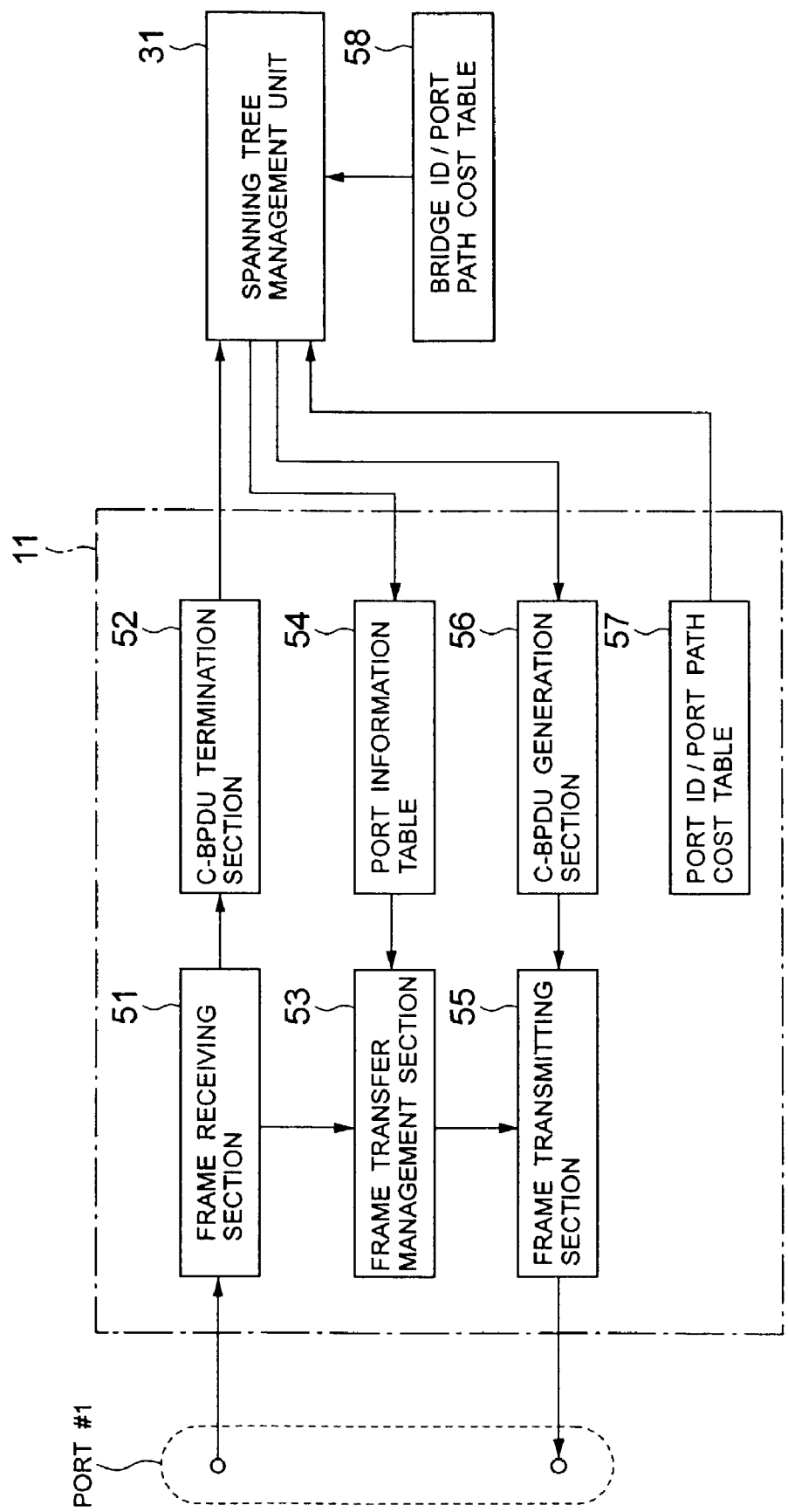
FIG. 3 is a block diagram showing an example of the frame processing unit shown in FIG. 1.

FIG. 3 is a block diagram showing the configuration of the frame processing unit 11. The other frame processing units 12 to 1n are identical in configuration to the frame processing unit 11. FIG. 3 shows a state in which the frame processing unit 11 is assigned to the spanning tree management unit 31 by the CPU 21. The CPU 21 is omitted in FIG. 3.

Referring to FIG. 3, a frame receiving section 51 receives a frame from the port and supplies the frame to a frame transfer management section 53 if the frame is an ordinary data frame, or to a C-BPDU termination section 52 if the frame is a C-BPDU. The frame transfer management section 53 performs control by referring to the contents of a port information table 54 such as to perform frame relay by delivering the received frame from the frame receiving section 51 to a frame transmitting section 55 or to discard the received frame. In the port information table 54, information as to whether the port status of the port #1 is an alternate port or a designated port is stored.

The frame transmitting section 55 sends out through the port #1 a data frame relayed from the frame transfer management section 53 or a C-BPDU from a C-BPDU generation section 56. An ID for the port #1 and a path cost at the port #1 set as a parameter are stored in a port ID/port path cost table 57. The C-BPDU termination section 52 receives a C-BPDU from the frame receiving section 51 and terminates the C-BPDU. The terminated C-BPDU is distributed to the spanning tree management unit 31 assigned to the port #1 by the CPU 21 (see FIG. 1). The C-BPDU generation section 56 is instructed by the spanning tree management unit 31 to produce a C-BPDU.

The spanning tree management unit 31 (as well as the other spanning tree management units) independently executes a spanning tree protocol construction processing procedure by using a C-BPDU terminated by the C-BPDU termination section 52. The spanning tree management unit 31 executes the procedure by referring to a table 58 in which bridge IDs and root path costs are stored and to the port ID/port path cost table 57.

FIG. 4 shows an example of the format of a C-BPDU for spanning tree construction. "BPDU TYPE" contained in a unit indicates that the unit is a C-BPDU. The frame receiving section 51 recognizes a received frame as a C-BPDU and outputs the received frame to the C-BPDU termination section 52 in the following stage.

"ROOT ID" is a bridge number for a bridge set as a root bridge in a spanning tree. "ROOT PATH COST" is a value representing the facility with which a root bridge is reached, as mentioned above. "BRIDGE ID" is a number given to a bridge and "PORT ID" is a port number (#). Other parameters are not particularly concerned with the present invention and will not be described in this specification. Details of this format are specified in IEEE802.1d.

Each of the spanning tree management units 31 to 3$m$ receives a C-BPDU through the port assigned to be managed by it, and performs, according to the received C-BPDU and on the basis of IEEE802.1d, management on the state of the port which belongs to it and constructs a spanning tree in the LAN connected to the port. Each of the spanning tree management units 31 to 3*m* operates independently without any influence on the other spanning tree management units.

According to the present invention, as described above, a plurality of spanning trees can be independently managed in one bridge. Therefore it is possible to divide a spanning tree in one LAN segment and to form a bridged LAN in which a plurality of spanning trees can exist in one LAN segment.

Figure 7:
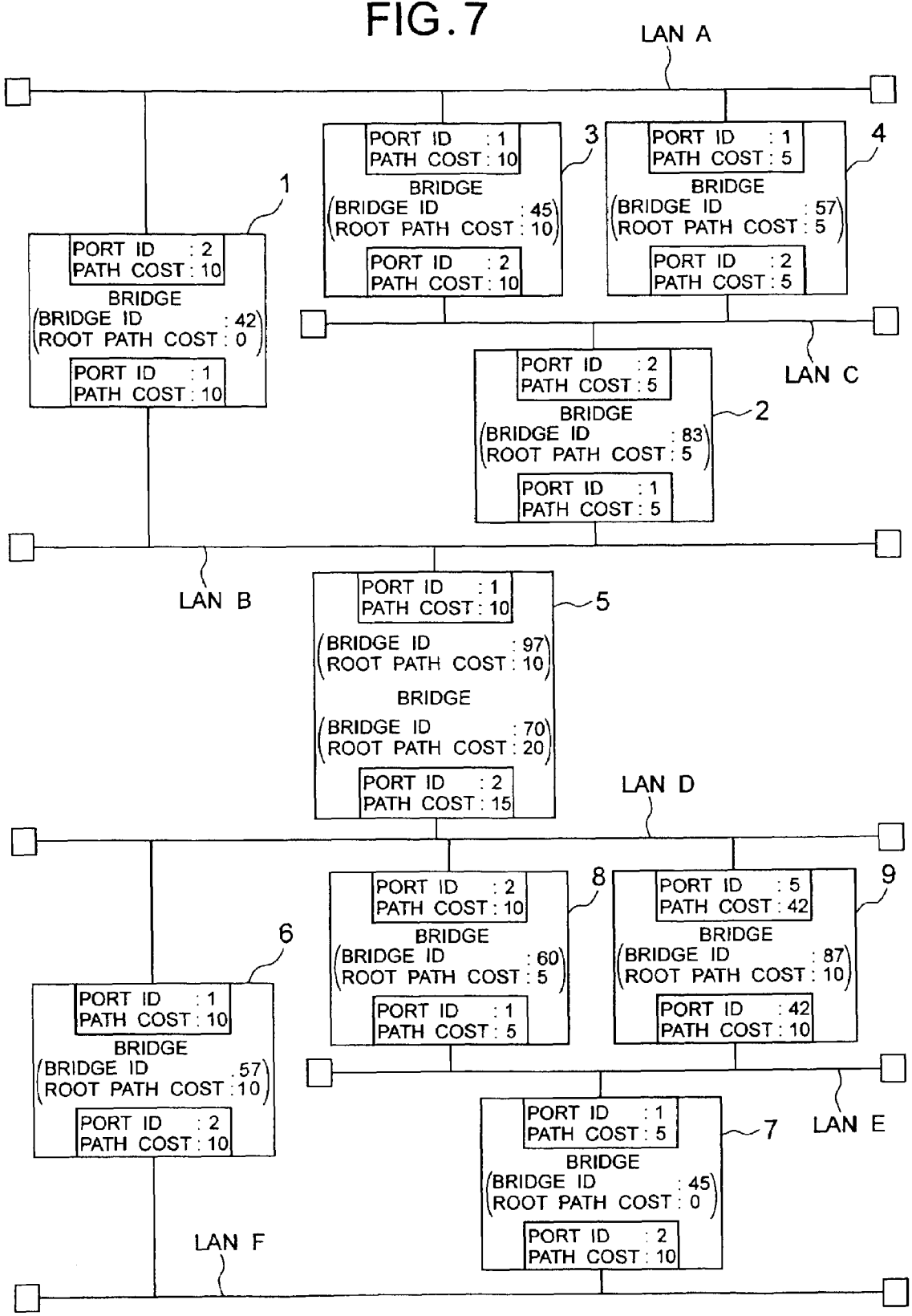
FIG. 7 is a diagram showing an example of a network configuration in the embodiment of the present invention.

Referring to FIG. 7, which shows a network in which a plurality of LANs are connected through bridges 1 to 9, bridges 1, 3, and 4 are interconnected by LAN A and bridges 1, 2, 5 are interconnected by LAN B.

Bridges 2, 3, and 4 are interconnected by LAN C and bridges 5, 6, 8, and 9 are interconnected by LAN D. Also, bridges 7, 8, and 9 are interconnected by LAN E and bridges 6 and 7 are interconnected by LAN F.

Bridges 1 to 9 are given bridge IDs, port Ids and path costs (including root path costs) by a network administrator or the like. Examples of these given values are shown in FIG. 7. The bridge having the plurality of spanning tree management units 31 to 3*m* shown in FIG. 1 is shown as bridge 5 in FIG. 7. In the illustrated network, a network administrator or the like makes a setting such that the port of the bridge 5 facing upward is managed by one spanning tree management unit, and the port facing downward is managed by another spanning tree management unit. For management by these spanning tree management units, two bridge IDs are independently defined in the bridge 5.

According to the present invention, a plurality of spanning trees are constructed in the network shown in FIG. 7. For example, referring to FIG. 8, two spanning tree domains (indicated by dotted lines 1 and 2) are constructed by the bridge 5. A procedure for this construction is outlined in the flowchart of FIG. 5. When the bridges start operating, they start sending and receiving C-BPDUs for spanning tree construction. Each C-BPDU includes root bridge ID information, root path cost information, and bridge ID information. Construction of a spanning tree is thus started.

When one of the C-BPDUs is received through some one of the ports (step S100), the CPU 21 determines, by referring to the assignment table 22, the spanning tree management unit according to the port through which the C-BPDU has been received (step S101). This C-BPDU is distributed to the determined spanning tree management unit (step S102), which executes a spanning tree management process, i.e., a spanning tree construction processing procedure (step S103).

Figure 6:
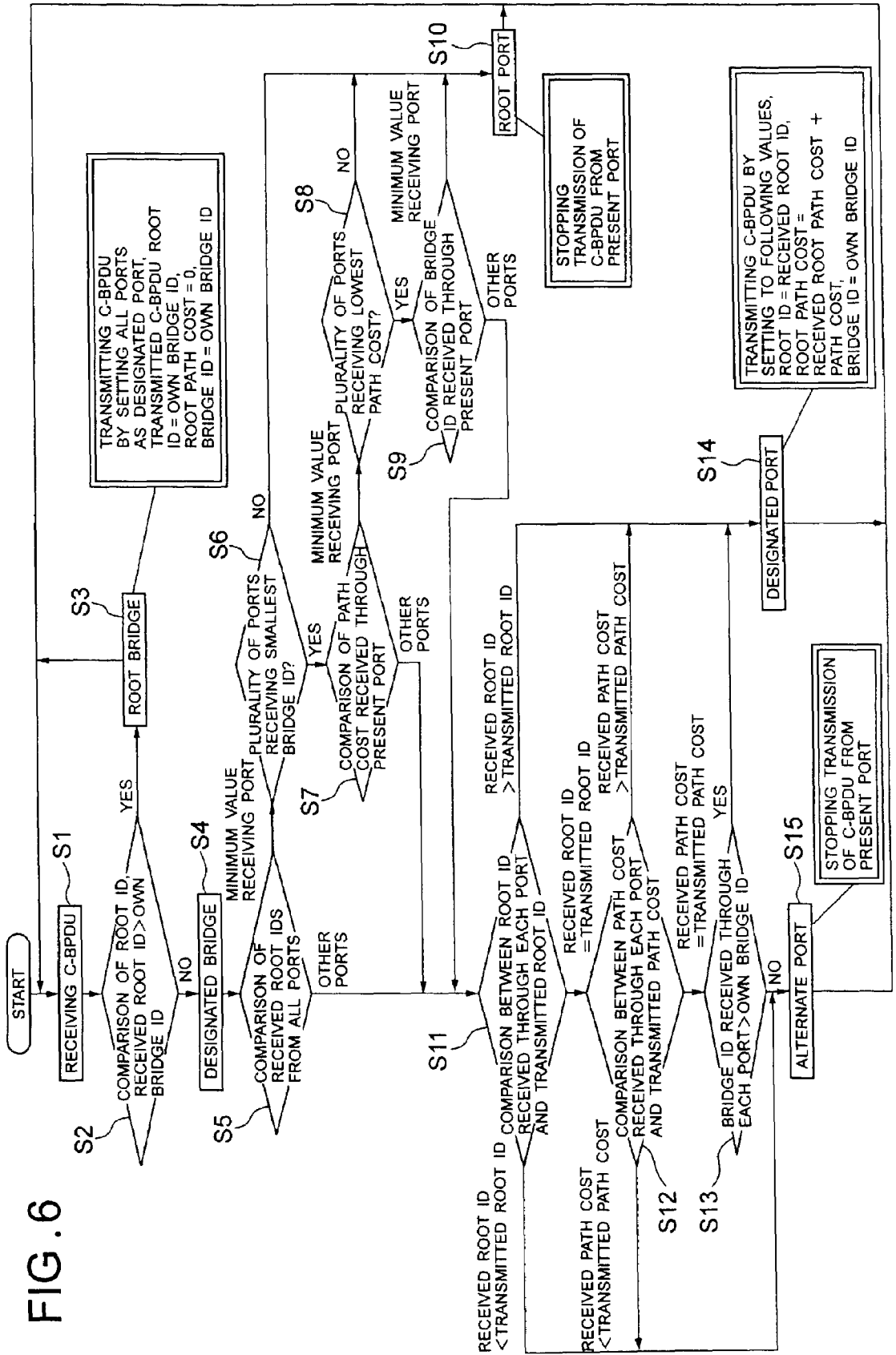
FIG. 6 is a flowchart showing details of a spanning tree construction processing procedure.

This spanning tree construction processing procedure is executed in steps S1 to S15 shown in the detailed flowchart of FIG. 6 on the basis of the specification in IEEE802.1d, as mentioned above. It will be only out lined since it is well-known. First, each bridge starts operating as if it is itself a root bridge since no root bridge has been determined, and sends out a C-BPDU by setting the bridge ID as a root bridge ID and by setting the root path cost to zero. At this time, the bridge 5 (see FIG. 7) sends out:

a C-BPDU having root bridge ID=bridge ID=97 through the port on the port ID 1 side; and a C-BPDU having root bridge ID=bridge ID=70 through the port on the port ID 2 side.

Then each bridge makes a determination described below on the basis of C-BPDU information received through its ports (step S1) and its own bridge ID. If any one of the root bridge IDs of the C-BPDUs received through its ports is larger than its bridge ID (step S2), the bridge becomes a root bridge (step S3).

In the case where the bridge is not a root bridge (step S4), it determines, as a root port, the port receiving the C-BPDU satisfying the following condition (step S10):

the root bridge ID in the C-BPDU is smaller than its bridge ID;

the root path cost in the C-BPDU is lower than the root path cost of the bridge if the root bridge ID is the same; and the bridge ID in the C-BPDU is smaller than its bridge ID if the root ID and the root path cost are the same.

Then the bridge making this determination assumes that the bridge corresponding to the root bridge ID in the received C-BPDU is a root bridge, updates the root bridge ID in the C-BPDU to be sent out to the corresponding value, updates the root path cost in this C-BPDU to the value obtained by adding the path cost set in it to the value of the root path cost contained in the received C-BPDU, and sends out the newly set C-BPDU through the port other than the root port.

These operations are repeated to finally determine as a designated port each of the ports still sending out the C-BPDUs (step S14) and as an alternate port each of the ports still receiving the C-BPDUs excluding the root ports (step S15), thus constructing a spanning tree.

Figure 8:
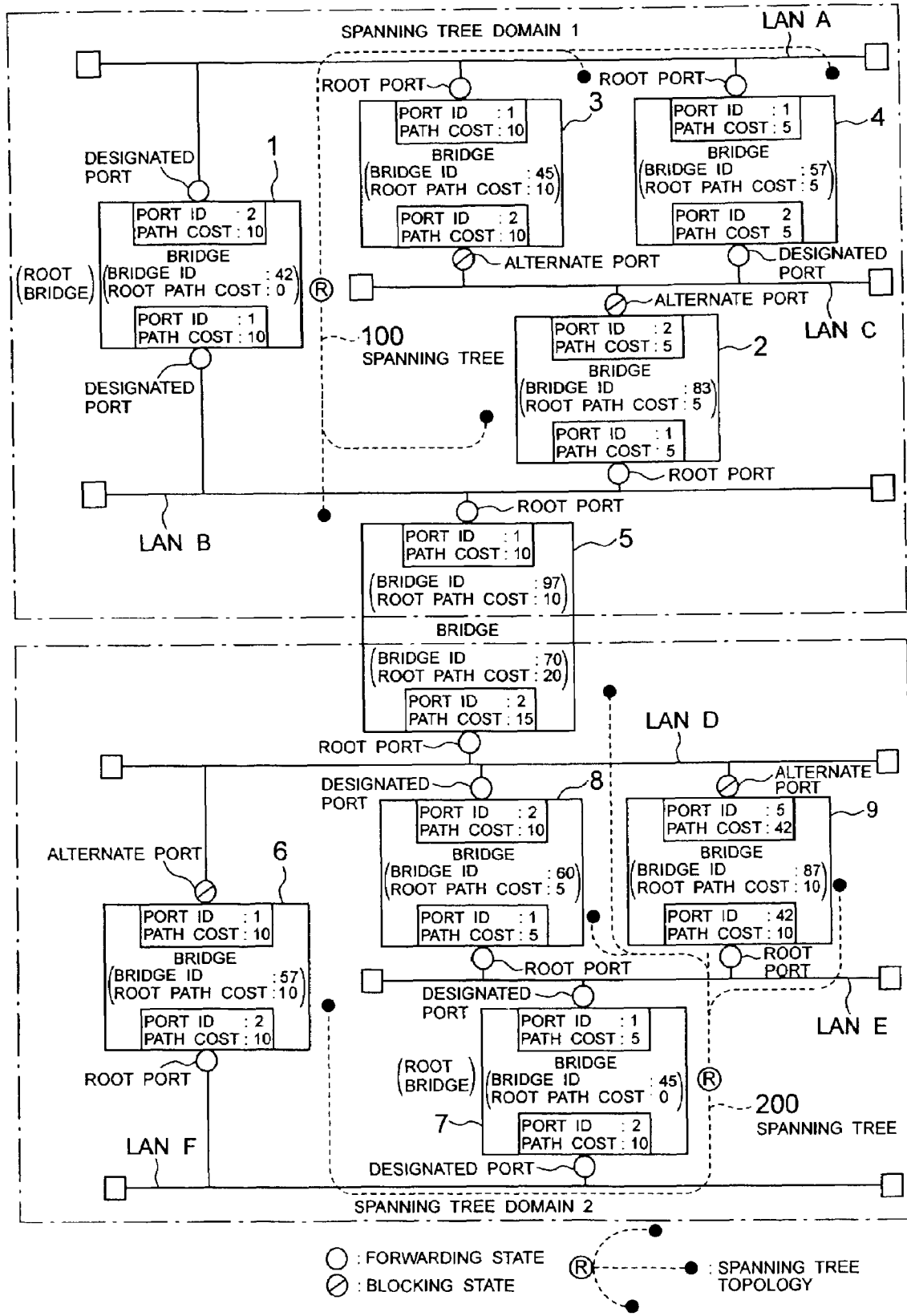
FIG. 8 is a diagram showing an example of construction of spanning trees in the network configuration shown in FIG. 7.

By these operations, the bridge 1 is determined as a root bridge since, as shown in FIG. 8, each of the root bridge IDs in all the C-BPDUs received by the bridge 1 is larger than the bridge ID set in the bridge 1. In the bridges 2 to 5, each port toward the bridge 1 (port ID1 of each bridge) is determined as a root port since the root bridge ID contained in the C-BPDU transmitted from the bridge 1 is the smallest.

Among the bridges 2, 3, and 4 connected by LAN C, the port 2 of the bridge 4 having the smallest root path cost continues sending out the C-BPDU till the final step and is therefore set as an designated port. Conversely, each of the ports 2 of the bridges 2 and 3 continues receiving the C-BPDU and is therefore set as an alternate port.

In the bridge 5, the C-BPDU received through the port 1 is managed by one of the spanning tree management units and has no influence on the port 2 side defined in combination with another of the spanning tree management units. Therefore the spanning tree having the bridge 1 as a root bridge is terminated just on the port 1 side of the bridge 5. In the network constituted by the bridges 6 to 9 connected to the port 2 of the bridge 5, the above-described C-BPDU exchange is also performed. In the example shown in FIG. 7, a spanning tree having the bridge 7 as a root bridge is formed. (The result of this spanning tree construction is indicated by the dotted line in FIG. 8.)

Also in this case, spanning tree information by means of the C-BPDU on the port 2 side of the bridge 5 has no influence on the port 1 side, so that the spanning tree having the bridge 7 as a root bridge is terminated in the bridge 5.

Also among the bridges 5 to 9, another spanning tree protocol processing is separately performed to determine a root bridge in the bridges 5 to 9 (bridge 6 in this case) and to form a different spanning tree having this root bridge. Thus, a plurality of spanning trees can be formed in one network segment.

An application of the present invention to a ring network will be described as another embodiment of the invention. Conventionally, bridged LANs are formed by being limited to a restricted area. With the increase in bandwidth of the network, a need has arisen to increase the speed and the area of networks. Ring networks have come into wide use as a wide-area network because they are easy to maintain and are advantageous in terms of fault avoidance.

Figure 9:
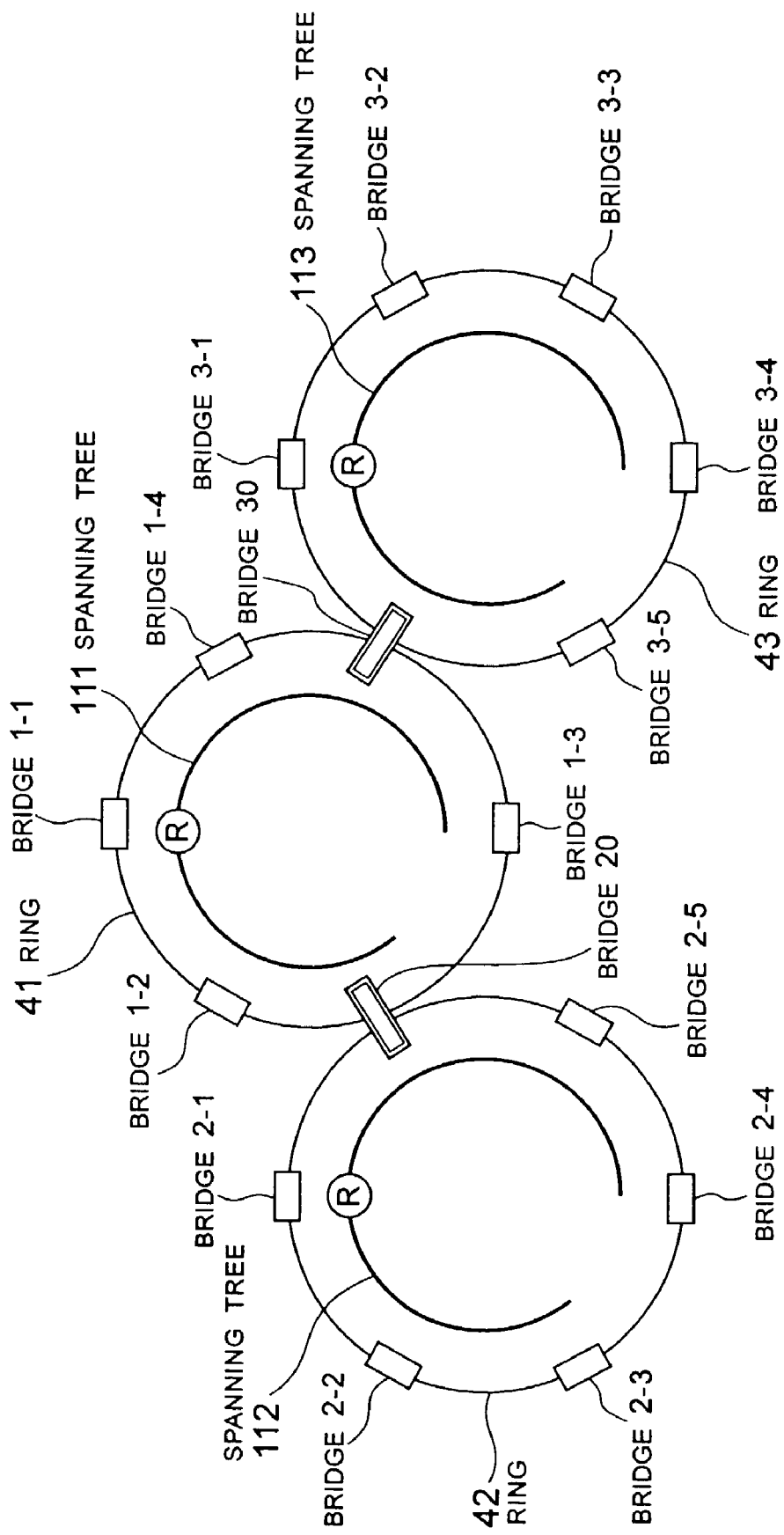
FIG. 9 is a diagram showing an example of construction of spanning trees in another embodiment of the present invention.
Figure 10:
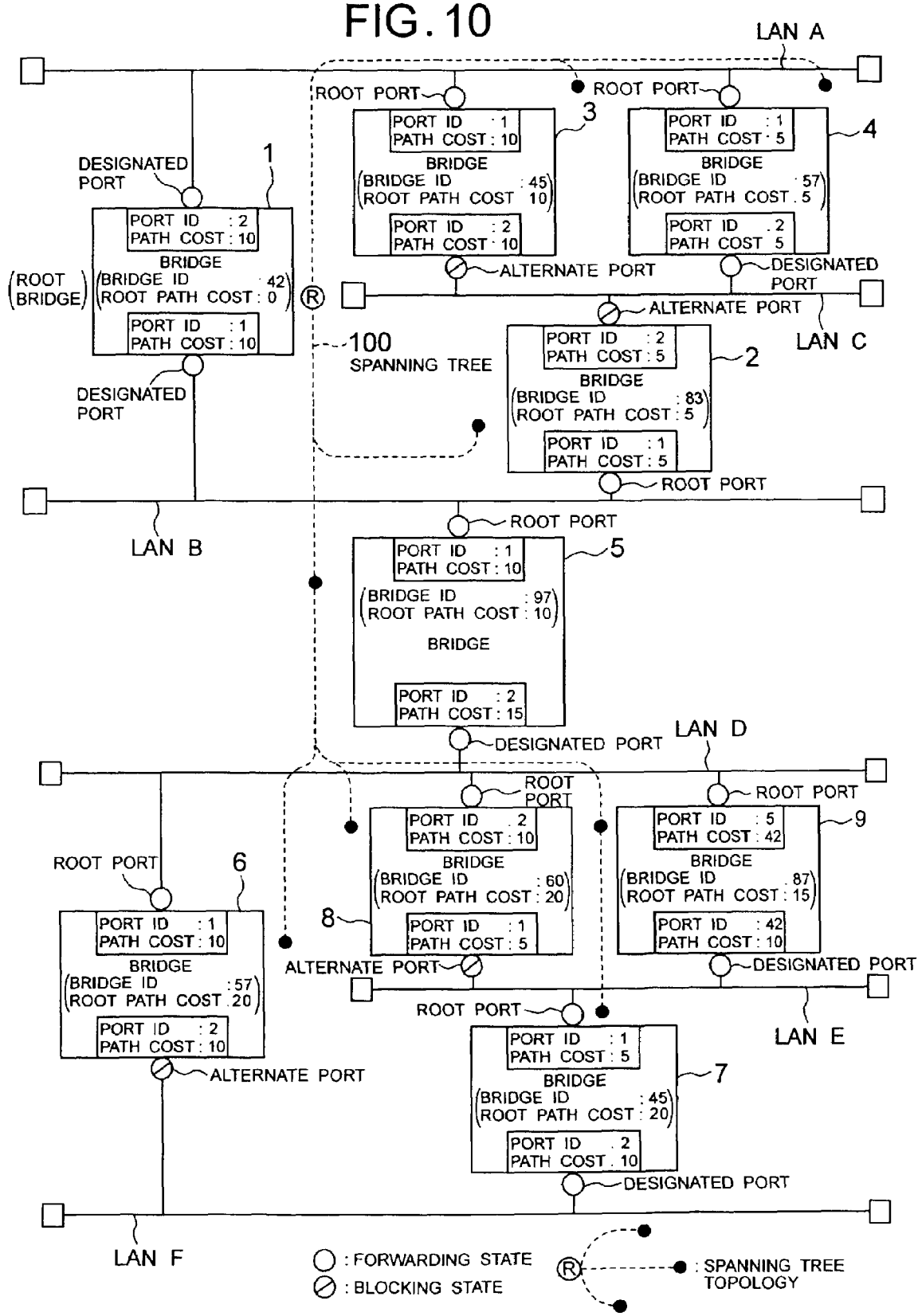
FIG. 10 is a diagram for explaining the prior art.

FIG. 9 shows a network in which bridges are placed in a ring form and three rings 41 to 43 are interconnected by bridges 20 and 30. Operations between the rings 41 and 42 will first be described with reference to FIG. 9. The ring 41 is constituted by bridges 1-1 to 1-4, a bridge 20 which is a point of connection to the ring 42, and a bridge 30 which is a point of connection to the ring 43. The bridges are connected in a one-to-one relationship to form a bridged network in ring form.

The ring 42 is constituted by bridges 2-1 to 2-5 and the bridge 20 which is a point of connection to the ring 41 (in which a port different from a port used in the ring 41 is used). The bridges are connected in a one-to-one relationship to form a bridged network in ring form.

The bridge 20 is formed of the bridge in accordance with the present invention. The bridge 20 has four ports. One spanning tree management unit is defined with respect to two of the ports of the bridge 20 constituting the ring 41. The other two ports of the bridge 20 constitute the ring 42. With respect to these ports, another spanning tree management unit is defined by a network administrator or the like. Therefore spanning tree protocol processings are separately performed in the rings 41 and 42 to construct spanning trees 111 and 112 in the rings 41 and 42, as indicated by the thick lines in FIG. 9.

Similarly, between the rings 41 and 43, the bridge 30 is formed of the bridge in accordance with the present invention. The same operations as those performed between the rings 41 and 42 are also performed to form another spanning tree 113 in the ring 43.

In this embodiment, the spanning tree topology in a network group (ring in this embodiment) is closed as described above and, therefore, reconstruction of a spanning tree necessitated by a fault in one network group has no ripple effect on the internal system of another network group. Also, service in network groups in which reconstruction is not performed is not interrupted.

Figure 5:
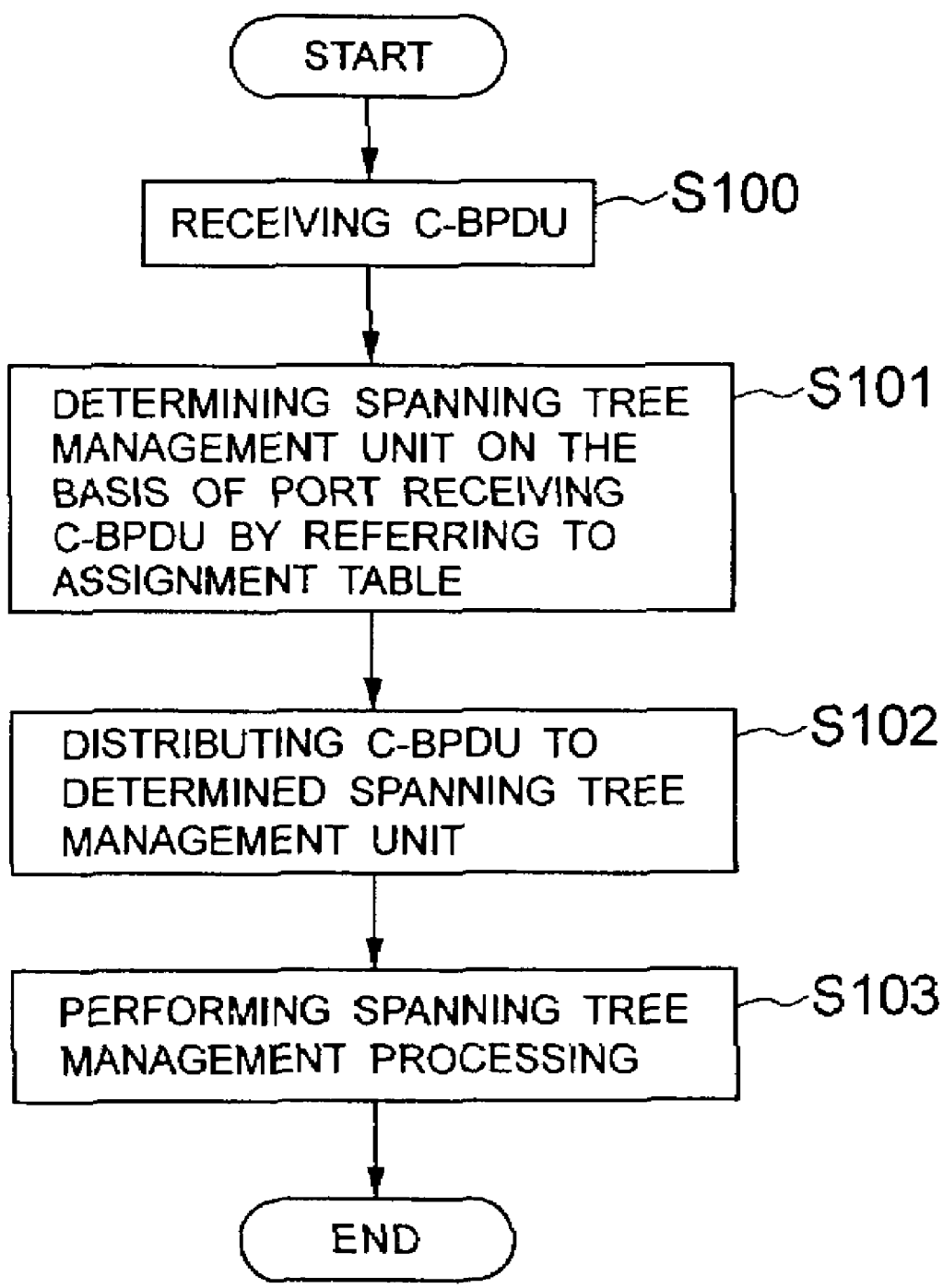
FIG. 5 is a flowchart outlining the operation of the present invention.

Needless to say, the sequence of operations shown in FIGS. 5 and 6 can be realized by being stored in advance as a program in a read-only storage medium such as a read-only memory (ROM) and by being read to a computer to be executed. While LANs have been described as a network to which the present invention is applied, the present invention can also be applied to general networks as well as to LANs. Therefore the bridge shown in FIG. 1 can also be applied to a wide range of communication apparatuses having bridging functions of data link layer.

As described above, the present invention has advantages described below. First, since a spanning tree formed in a network such as a LAN in one segment is divided, the total number of bridges constituting one spanning tree is reduced, thereby spanning tree reconstruction necessitated by a fault or the like at any point enables to be completed in a reduced time.

Second, since a spanning tree formed in a network is divided, a fault area can be minimized to enable service to be continued in the spanning tree region unrelated to tree reconstruction without being interrupted.

Third, the method of assignment between a plurality of ports and a plurality of spanning tree management units can be controlled with flexibility. Therefore it is possible to construct spanning trees which are independent each other, on a ring basis by using bridges connecting a plurality of ring networks.

What is claimed is:

1. A communication device for interconnecting a plurality of networks, comprising a plurality of spanning tree management means for managing spanning trees in the plurality of networks,
   wherein each of said spanning tree management means is given in advance a bridge ID which is identification information for management of spanning trees, and each of said spanning tree management means executes a spanning tree construction processing procedure by employing the bridge ID,
   wherein the communication device corresponds to a single bridge that spans two of said plurality of networks, and
   wherein each of said spanning tree management means operates independently of each other.

2. The communication device according to claim 1, further comprising control means for controlling assignment of a plurality of ports forming interfaces with the networks to said plurality of spanning tree management means.

3. The communication device according to claim 2, wherein said control means performs the assignment control by referring to a table in which a state of assignment between said plurality of ports and said plurality of spanning tree management means is stored.

4. A communication device for interconnecting a plurality of networks, comprising:
   a plurality of spanning tree management means for managing spanning trees in the plurality of networks; and
   control means for controlling assignment of a plurality of ports forming interfaces with the networks to said plurality of spanning tree management means,
   wherein said control means performs the assignment control by referring to a table in which a state of assignment between said plurality of ports and said plurality of spanning tree management means is stored, and
   wherein each of said spanning tree management means executes the spanning tree construction processing procedure by exchanging bridge protocol data units (BPDU) with other communication devices, and said control means determines, by referring to said table, to which one of said spanning tree management means each of the ports receiving the bridge protocol data units is assigned,
   wherein the communication device corresponds to a single bridge that spans two of said plurality of networks, and
   wherein each of said spanning tree management means operates independently of each other.

5. A network system comprising a plurality of networks and communication devices through which said networks are interconnected, said communication devices having a plurality of spanning tree management means for managing spanning trees in said plurality of networks,
   wherein each of said spanning tree management means is given in advance a bridge ID which is identification information for management of spanning trees, and each of said spanning tree management means executes a spanning tree construction processing procedure by employing the bridge ID,
   wherein at least one of said communication devices corresponds to a single bridge that spans two of said plurality of networks,
   wherein said at least one of said communication devices includes more than one of said plurality of spanning tree management means, and wherein each of said more than one of said spanning tree management means operates independently of each other.

6. The network system according to claim 5, further comprising control means for controlling assignment of a plurality of ports forming interfaces with the networks to said plurality of spanning tree management means.

7. The network system according to claim 6, wherein said control means performs the assignment control by referring to a table in which a state of assignment between said plurality of ports and said plurality of spanning tree management means is stored.

8. A network system comprising:
a plurality of networks and communication devices through which said networks are interconnected, said communication devices having a plurality of spanning tree management means for managing spanning trees in said plurality of networks; and
control means for controlling assignment of a plurality of ports forming interfaces with the networks to said plurality of spanning tree management means,
wherein said control means performs the assignment control by referring to a table in which a state of assignment between said plurality of ports and said plurality of spanning tree management means is stored, and
wherein each of said spanning tree management means executes the spanning tree construction processing procedure by exchanging bridge protocol data units (BPDU) with other communication devices, and said control means determines, by referring to said table, to which one of said spanning tree management means each of the ports receiving the bridge protocol data units is assigned,
wherein at least one of said communication devices corresponds to a single bridge that spans two of said plurality of networks,
wherein said at least one of said communication devices includes more than one of said plurality of spanning tree management means, and
wherein each of said more than one of said spanning tree management means operates independently of each other.

9. A method of constructing a spanning tree in a network system having a plurality of networks and communication devices for interconnecting said networks and for managing spanning trees, said method comprising, as a step performed in each of said spanning tree management means that are provided in one of said communication devices, a step of executing a spanning tree construction processing procedure by using bridge IDs which are identification information respectively given in advance to the spanning tree management means to enable spanning tree management
wherein each of said spanning tree management means provided in said one of said communication devices operates independently of each other.

10. The method according to claim 9, wherein the spanning tree construction processing procedure is executed by exchanging bridge protocol data units (BPDU) with other communication devices.

11. The method according to claim 10, further comprising a step of determining, in response to reception of one of the bridge protocol data units, to which one of the spanning tree management means a port receiving the bridge protocol data unit is assigned, the determination being made by referring to a prescribed table.

12. A recording medium on which is recorded a program for making a computer execute control of the operation of a communication device for interconnection between a plurality of networks, said program including a control step for controlling assignment of a plurality of spanning tree construction processing procedures to a plurality of ports forming interface with the networks,
wherein the assignment control in said control step is performed by referring to a table in which a state of assignment between the plurality of ports and the plurality of spanning tree construction processing procedures is stored in advance, and
wherein each of the plurality of spanning tree construction processing procedures is executed by exchanging bridge protocol data units (BPDU) with other communication devices, and said control step includes determining, by referring to the table, to which one of the spanning tree construction processing procedures each of the ports receiving the bridge protocol data units is assigned,
wherein at least one of said communication devices corresponds to a single bridge that spans two of said plurality of networks,
wherein said at least one of said communication devices includes more than one of said plurality of spanning tree management means, and
wherein each of said more than one of said spanning tree management means operates independently of each other.

13. A communication device for interconnecting a plurality of networks, comprising a plurality of spanning tree management unit configured to manage spanning trees in the plurality of networks,
wherein each of said spanning tree management units is given in advance a bridge ID which is identification information for management of spanning trees, and each of said spanning tree management units is configured to execute a spanning tree construction processing procedure by employing the bridge ID,
wherein the communication device corresponds to a single bridge that spans two of said plurality of networks, and
wherein each of said spanning tree management means operates independently of each other.

14. A communication device for interconnecting a plurality of networks, comprising:
a plurality of spanning tree management units configured to manage spanning trees in the plurality of networks; and
a control unit configured to control assignment of a plurality of ports forming interfaces with the networks to said plurality of spanning tree management units,
wherein said control unit is configured to perform the assignment control by referring to a table in which a state of assignment between said plurality of ports and said plurality of spanning tree management units is stored, and
wherein each of said spanning tree management units is configured to execute the spanning tree construction processing procedure by exchanging bridge protocol data units (BPDU) with other communication devices, and said control unit is configured to determine, by referring to said table, to which one of said spanning tree management units each of the ports receiving the bridge protocol data units is assigned, wherein the communication device corresponds to a single bridge that spans two of said plurality of networks, and wherein each of said spanning tree management units operates independently of each other.

15. The method according to claim 9, wherein each of said communication devices performs the steps of:

initially operating as a root node;

sending out a C-BPDU by setting the bridge ID as a root bridge ID and by setting a root path cost to zero; and determining, on the basis of C-BPDU information received through one of its ports, a root port.

* * * * *